United States Patent
Christian, deceased et al.

[15] 3,637,069

[45] Jan. 25, 1972

[54] SCREW CONVEYOR APPARATUS

[72] Inventors: Joseph D. Christian, deceased, late of San Francisco, Calif.; Marcella B. Christian, executrix; Robert F. Christian, executor, both of San Francisco, Calif.

[73] Assignee: Packaged Power Terminals Inc., San Francisco, Calif.

[22] Filed: May 12, 1969

[21] Appl. No.: 823,999

[30] Foreign Application Priority Data

May 21, 1968 Great Britain......................24,127/68

[52] U.S. Cl............................................................198/213
[51] Int. Cl........................................................B65g 33/00
[58] Field of Search........................165/87; 198/213; 415/74

[56] References Cited

UNITED STATES PATENTS

| | | | |
|---|---|---|---|
| 2,321,185 | 6/1943 | Christan | 165/87 |
| 550,379 | 11/1895 | McIntyre | 198/213 |
| 2,733,898 | 2/1956 | Christian | 198/213 |

FOREIGN PATENTS OR APPLICATIONS

| | | | |
|---|---|---|---|
| 6,409 | 8/1901 | Austria | 415/74 |

Primary Examiner—Richard E. Aegerter
Attorney—Young & Thompson

[57] ABSTRACT

The invention relates to a screw conveyor apparatus having a support shaft and a screw disposed helically around the support shaft and attached to the shaft at its ends, said screw being spaced from the shaft by a series of lugs that are attached to the screw and are slidable on the shaft and are spaced apart from each other to leave spaces between the screw and the shaft.

3 Claims, 10 Drawing Figures

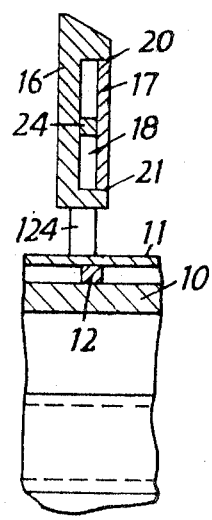
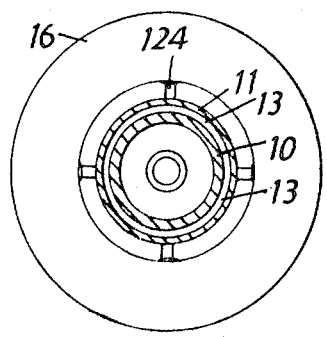
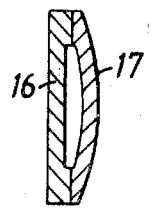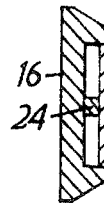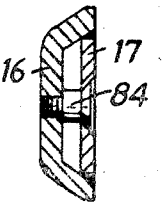

SCREW CONVEYOR APPARATUS

This invention relates to a screw conveyor apparatus especially for mixing materials or for effecting heat exchange between a material to be treated and another substance, e.g., steam for heating or brine for cooling.

The apparatus has a hollow shaft surrounded by rotary screw which may be hollow or solid. Two or more shafts and screws may be mounted so that the screw of one overlaps and interleaves with the adjacent screw.

The main object of the present invention is to minimize possibility of material wedging in corners or angles between the screw and shaft.

According to the invention the apparatus comprises a support shaft and a screw disposed helically around the support shaft and attached to the shaft at its ends, said screw being spaced from the shaft by a series of lugs that are attached to the screw and are slidable on the shaft and are spaced apart from each other to leave spaces between the screw and the shaft.

One or more of the screws may be movable axially for more efficient constant relocation of the particles of the material and/or so that the screws contact each other intermittently and thereby provide a self-cleaning action.

Axial movement of the flights cause movement of material under the flight between the flight and the outside diameter of the shaft. This has a cleaning effect and prevents the material from reposing there and therefore further insures uniform processing.

For cleaning purposes, a cleaning fluid may be used which also will flow between the screw and the shaft.

The inner periphery of the screw may be spaced from the shaft a distance equal to from 5 to 20 percent, e.g., 6 to 12 percent of the radial size of a screw from its inner diameter to its outer diameter, preferably 6 to 10 percent, e.g., one-quarter to 1 inch preferably 0.30 to 0.75 inch. The screw preferably has a constant internal and external diameter, and a pitch less than its overall diameter. The screw may tough or nearly touch the shaft of the adjacent screw.

According to an important feature of the invention the screw is made by forming each flight of the screw separately, each flight being made from two plates, one of which is machined on one side thereof to form a duct for heat exchange medium, the other plate then being welded to the ducted plate to cover the duct by two weld seams. The seams may be both on the same side of the ducted plate or one on the outer side and the other on the inner side. When welding is completed, the bead is deliberately left to protrude above the rear face of the flight and then the flight disc which is now a circle with two parallel sides, is very easily polished by a grinder such as a Blanchard grinder. Thus, when the flight is bored in the center hole and turned on the outside, and blanchard ground on the parallel faces, it is difficult to detect that there has even been a weld made.

One form of cross section of the flight has square edges and two parallel faces.

Another form of cross section (e.g., for treating sugar) has a scarf of 30° on the outside diameter and a similar scarf on the inside diameter.

Another cross section has a roof top design (e.g., for vegetable slurry) on the outside diameter with the angles of the roofs bearing from 30° up to 60° and a similar cross section on the inside diameter of the flight.

The flights may be made in sections from complete circles and each section develops when formed, slightly over one pitch. Experience has shown that a flight formed from a 360° circle will develop normally about 400° in pitch, if the pitch is the same as the diameter and proportionately less if the pitch is less than the diameter. The succession of flights must be joined to each other and provided with radial lugs to space them away from the central shaft. It is obvious that the weld that joins one flight to the other has to go along the front face and the rear face of the flight, across the top edge and across the bottom edge of the flight. Therefore, these welds have to be individually ground and cleaned with tooling for that purpose.

This springlike construction of the screw allows it to expand and contract freely and completely isolates from the central pipe any expansion or contraction forces from the flights themselves. Torsion for driving the screws is preferably done by pipe within a pipe.

The central shaft may comprise an assembly of three concentric tubular members. The outer one may desirably be of stainless steel or aluminum or other metal. This can be relatively thin because it has no mechanical function such as torque transmission, and is not used for welding of the flights to it. It is spaced away from another tube that should have torsional capacity to transmit the desired horsepower for rotation of the screw. Between this torsional tube and the outer tube is an annular passage. This passage must be limited to a reasonable size so the flow through this space will be turbulent. To accomplish this, a turbilizer member may be introduced, comprising a spiral wound of square or rectangular bar with a pitch so that the steam or water flowing through this passage actually follows through a duct that spirally winds between the walls of the outer and the inner pipe. This pitch can be regulated so that the area of it is equivalent to a pipe size as the processing requires. This is a most important aspect of this design and it has the further function of correctly spacing in coaxial position the outer pipe from the inner pipe, and giving structural support to the lugs that space the flights away radially from the outer pipe. A return line is sized in proportion to the area of the annular passage (as modified by the turbilizer) and the flight duct area. The return line thus becomes a controlled orifice in the system.

Depending upon the processing required and the material being processed, it is desirable that the heat exchange media, such as steam, hot oil, water, brine, etc., be optionally selected as counter or parallel flow. This is normally accomplished by a rotary gland design, well known in the art.

It is customary that the introduction of the media be at the end opposite to the drive end.

Because this apparatus will utilize axial as well as rotational movement, the application of the joint to the apparatus may be suitably modified to allow freedom of axial movement. This immediately suggests that this joint be not coaxial with the screws but arranged conveniently above, below or to one side and connected by flexible hose suitable for permitting the axial movement.

For sealing the housing where the shafts extend through one end thereof, a bellows or piston device or other seal may be used.

In the accompanying drawings:

FIG. 2 shows a detail of a similar view but showing certain parts in section;

FIG. 3 is a sectional view on the line 3—3 in FIG. 1 but showing the flight in full lines;

FIGS. 4 to 8 are sectional views of modified forms of flight;

Figure 1:
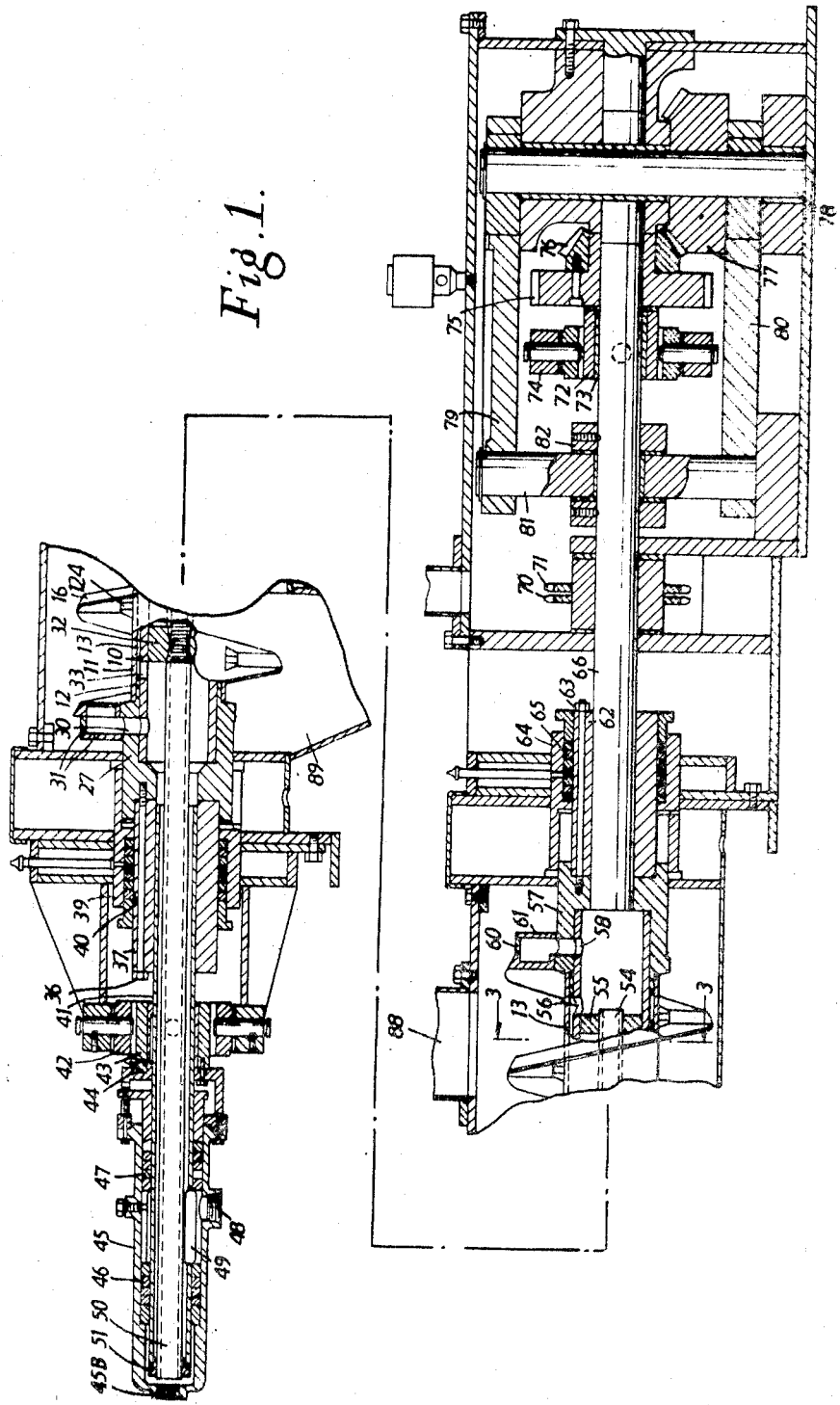
FIG. 1 is a sectional view of a shafting and flight made in accordance with the invention.

A torque tube 10 is spaced from a mounting tube 11 which surrounds it, by a turbilizer 12 which is a square section helix, leaving an annular passage 13.

Surrounding the tube 11 is a hollow screw helix or flight formed from a series of plates 16, 17. Plate 16 is machined out to form a duct space 18 for heat exchange medium. The other plate 17 is welded over the space 18 by weld seams 20, 21 on the same side of plate 16. The inner periphery of the screw is spaced from the tube 11 by a series of lugs 124 which are welded to the plate 16 at intervals so as to leave a helical space between the screw and the tube 11. The outer periphery of plate 16 is at an angle of between 30° and 60°. The plates are spaced apart by spacers 24.

The left-hand end of the tube 11 carrying the flight 16, 17 is welded to a hollow boss 27. The end of tube 10 is fixed within this boss. A hole 30 passes through the boss and tube 10 and a cover 31 provides a channel from this hole to the inside of the flight. The hole leads to the inside of the end of tube 10 which is blocked off from the remainder of tube 10 by a plug 32. This end of tube 10 also communicates through a hole 33 with the space 13.

The boss 27 is fixed by bolts 36 to a bearing sleeve 37 which rotates in a bearing 39 provided with a stuffing box 40.

One end of a tube 41 is fixed within the bearing 37 and extends out through a bearing 42 where the tube 41 carries bearing rings 43, 44. A casing 45 surrounds the projecting end of the tube 41 and carries stuffing boxes 46, 47 sealing against the tube 11. The tube 41 serves as an outrigger to carry one end of a pipe 50 by means of a bush 51. The other end of pipe 50 is screwed into an aperture in the plug 32.

The left-hand end of a pipe 54 is screwed into this aperture and its right-hand end passes through an aperture in a plug 55 near the right-hand end of the tube 10. The tube 10 beyond the plug 55 has a hole 56 leading to space 13.

The right-hand end of the tube 11 is fixed to a hollow boss 57 and a hole 58 passes through the tube 11 and boss 57 to provide communication from the interior of tube 11 to the inside of the flight 16 via a chamber formed by casing members 60, 61.

The boss 57 has a bearing sleeve 62 fixed to it by bolts 63 and this sleeve is mounted in a bearing 64 having a stuffing box 65. One end of a driving shaft 66 is fixed within the sleeve 62 and this shaft extends into a gear housing 67 where it carries driving sprockets 70, 71, bearing rings 72, 73 carried by bearing 74, gearwheel 75 (geared with a corresponding gearwheel of the corresponding flight not shown) and a bevel gear 76. The bevel gear 76 drives a bevel gear 77 on a spindle 78 which reciprocates crank rods 79, 80 which carry a cross rod 81 fixed by block 82 to the shaft 66 whereby shaft 66 is reciprocated axially for causing the flight to approach the corresponding flight with which it meshes so as to increase the movement of the material being treated thereby increasing the heat exchange efficiency and if necessary causing the flights to clean each other.

The casing 45 has a threaded nipple 48 for introduction of steam, brine or other heat exchange medium which passes through a hole 49 in the tube 41 into a space 45A between pipe 50 and tube 41. This medium passes into the end of pipe 10 and then through hole 30 into the hollow flight and simultaneously through hole 33 into space 13. The medium passes through the holes 56, 58 into the right-hand end of the tube 10 and enters the inner pipe 54 and passes to the left-hand end of the apparatus to leave through a threaded nipple 45B in casing 45. Thus the medium flows through the screw and shaft 11 simultaneously in the same direction, and enters and leaves in a single stream.

The flights are enclosed by a housing 87 having an inlet 88 for material to be treated and a discharge opening 89.

If desired, the gears, timing sprocket, and timing gears could be at the left-hand end, i.e., the same end as the inlet and outlet of heat exchange medium.

Also, if desired, a bellows type of housing could be provided to accommodate the axial reciprocation of the flight or flights.

As shown in FIG. 4 the plates 16, 17 are of similar bowed shape welded together at their outer and inner edges with their recessed sides towards each other.

FIG. 5 shows a variant in which the plate 16 is recessed on one side and plate 17 is of bowed shape.

FIG. 6 shows plates 16, 17 of similar shape each machined out on one side to form a recess, these sides being towards each other. The plates formed a roof-shape at the outer and inner peripheries.

FIG. 7 shows a modification in which the flight is similar to FIG. 2 with the inner periphery also chamfered at an angle of 30°–60 in the opposite direction to the chamfer at the outer periphery.

FIG. 8 shows an arrangement similar to FIG. 7 but in which the plates 16, 17 are connected together and spaced apart by studs 84.

The radial lugs 124 that space the flights away from the pipe standard, are not fastened to the shaft; therefore, it is possible by detaching the terminals of the flight assembly to strip the entire flight 16, 17 from the central pipe 10 and a new section of flighting put on without throwing the central pipe 10 away. Also, the outer tube 11 of the central pipe can be renewed without throwing the torque tube 10 and the internal supply tube and ports, etc., away. This means a substantial reduction in the cost of replacing screws because a replacement spiral can be made up and shipped as a spiral and mounted in the field to an existing standard assembly.

If desired, each screw may be in two or more sections each supplied with heat exchange medium separately and exhausted separately.

Figure 10:
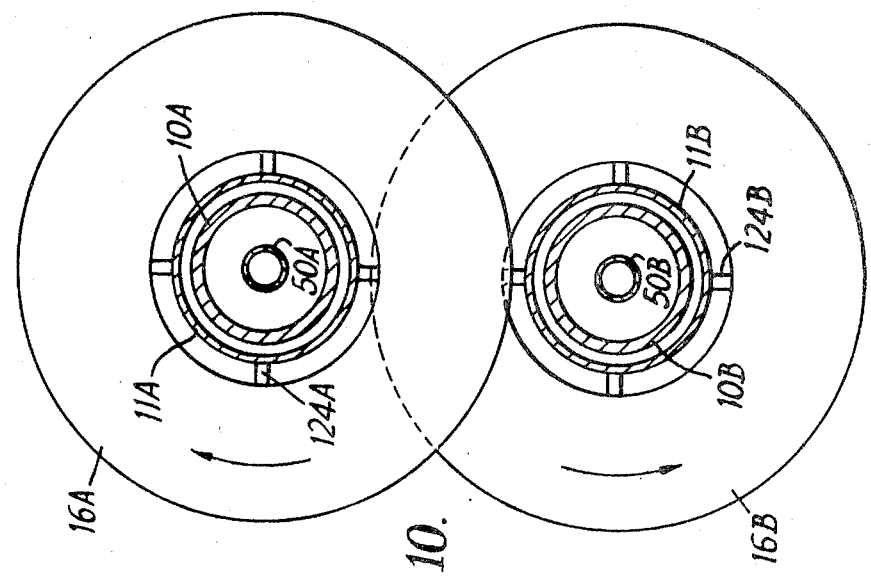
FIG. 10 is an end view of the parts shown in FIG. 9.
Figure 9:
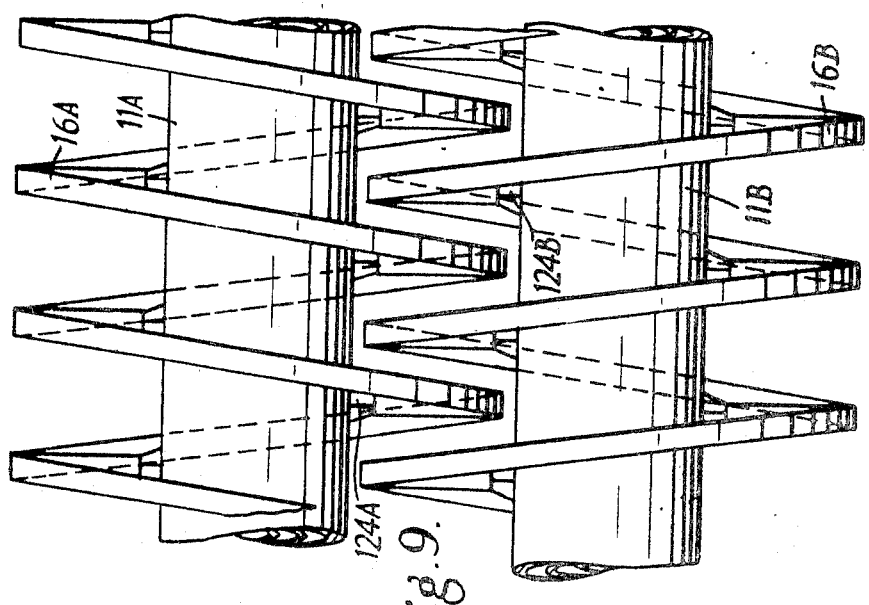
FIG. 9 is a part view showing two screws.

FIGS. 9 and 10 show two screws 16A, 16B and corresponding parts. Each screw approaches into close proximity with the shaft of the other screw. The overlapping helices of the screws are spaced apart axially a small distance so that they each can move axially like a spring to accommodate pressure from the material being processed. The diameter of each screw is normally from one and a half to three times the diameter of the shaft. The diameter of the screw is normally from two to three times the pitch.

In a self-cleaning application, the axial movement will be such that it will cause the flight face to engage and dwell in engaged contact with each other before reversing the stroke to engage the opposite face where the flights will again dwell in engaged contact with one another. But, when self-cleaning is not required, the axial movement should be restricted so that it is from one-half to two-thirds the movement required for engaging surfaces and this will add a linear motion that will not only increase the heat-exchange factor but will guarantee movement of the material through the passage between the inside diameter of the flight and the outside diameter of the assembly standard. The axial movement is depended on to push the material through this area.

The screw generally has more than six helices and may be more than 10.

What is claimed is:

1. A screw conveyor apparatus having a driven shaft a hollow support shaft that surrounds said driven shaft and is supported on said driven shaft by spacing means, a helical flight disposed about the support shaft, connection means at the ends of said flight securing said flight to said driven shaft only at the ends of said flight, a series of lugs secured to said flight but not to said support shaft and spacing said flight from said support shaft, said lugs being spaced apart from each other to leave spaces between the flight and the support shaft, said flight being hollow and being comprised of a first series of plates welded together and recessed to form a hollow space covered by a second series of plates.

2. Apparatus as claimed in claim 1, said first series of plates being spaced from the other by spacing members located in said hollow space.

3. Apparatus as claimed in claim 1, said second series of plates being also recessed to form a part of said hollow space.

* * * * *